(12) United States Patent
Coyle et al.

(10) Patent No.: US 7,287,249 B2
(45) Date of Patent: Oct. 23, 2007

(54) METHOD AND SYSTEM FOR TRACKING AND EXCHANGING INCREMENTAL CHANGES TO HIERARCHICAL OBJECTS

(75) Inventors: Mark S. Coyle, San Francisco, CA (US); Jeffrey Michael Fischer, San Francisco, CA (US); Min Lu, Fremont, CA (US); Shuang Huang, Fremont, CA (US); Alexander S. Warshavsky, San Francisco, CA (US)

(73) Assignee: Siebel Systems, Inc., San Mateo, CA (US)

( * ) Notice: Subject to any disclaimer, the term of this patent is extended or adjusted under 35 U.S.C. 154(b) by 643 days.

(21) Appl. No.: 10/299,211

(22) Filed: Nov. 18, 2002

(65) Prior Publication Data

US 2007/0226730 A1 Sep. 27, 2007

Related U.S. Application Data

(63) Continuation of application No. 09/967,898, filed on Sep. 28, 2001, now abandoned.

(51) Int. Cl.
*G06F 9/44* (2006.01)

(52) U.S. Cl. .................... 717/168; 717/170; 707/100; 707/203

(58) Field of Classification Search ........ 717/165–173, 717/175; 707/203–204, 100; 709/203–248
See application file for complete search history.

(56) References Cited

U.S. PATENT DOCUMENTS 5,347,653 A * 9/1994 Flynn et al. ................ 707/203
6,341,316 B1 * 1/2002 Kloba et al. ............... 709/248
6,775,829 B1 * 8/2004 Kroening .................. 717/175
6,928,644 B1 * 8/2005 Kroening et al. .......... 717/175
2002/0046296 A1 * 4/2002 Kloba et al. ............... 709/248
2002/0052916 A1 * 5/2002 Kloba et al. ............... 709/203
2002/0103816 A1 * 8/2002 Ganesh et al. ............. 707/204

* cited by examiner

Primary Examiner—Meng-Al T. An
Assistant Examiner—Mark P. Francis
(74) Attorney, Agent, or Firm—Campbell Stephenson LLP

(57) ABSTRACT

Techniques to track and publish changes to object instances. For an "outbound process" to publish object instances, a list of object instances is initially received. For each received object instance, a determination is made whether or not the object instance has changed since its last publication. For each changed object instance, a delta snapshot is generated and includes data indicative of changes between the current and last published versions of the object instance. Delta snapshots for all changed object instances are then published. For an "inbound process" to receive object instances, the published delta snapshots are initially received. For each received delta snapshot, the corresponding object instance is retrieved and updated with the changes included in the delta snapshot. A new snapshot is also generated for each updated object instance such that the received changes are not published, and unpublished changes made locally are noted for subsequent publication.

28 Claims, 13 Drawing Sheets

METHOD AND SYSTEM FOR TRACKING AND EXCHANGING INCREMENTAL CHANGES TO HIERARCHICAL OBJECTS

BACKGROUND OF THE INVENTION

The present invention relates generally to computer processing, and more particularly to techniques for tracking and exchanging incremental changes to hierarchical objects.

Many complex software applications have been developed to assist business enterprises manage and operate their businesses. An important class of such software applications focuses in the area of customer relationship management (CRM). A CRM application allows an enterprise to maintain track of various "entities" such as accounts, contacts, products, activities, service requests, and so on, and to define the relationships between the entities with sets of rules (e.g., business opportunities). Each entity and business function may be represented at a higher layer as a "business object", which may represent a hierarchical collection of data and functions that describe the entity or business function as well as the operations capable of being performed on or by the entity or business function.

Many instances of the business objects may be formed from records in various (lower-level) tables maintained in a database, which is typically associated with a particular schema and meta data. The schema describes the organization and format of the database, e.g., the specific tables used to describe and identify the data stored in the database. The meta data defines the structure of the schema and comprises data about the underlying physical data stored in the database. The database is typically updated over time to reflect changes to the data stored in the database. For example, any modification, addition, or deletion of an object instance is reflected in the underlying table(s) used to implement the object.

A database may be maintained for each of a number of systems. Each database may be associated with its own schema and meta data. The object instances created and maintained for each system may be accessed by various software applications executing on the system. These object instances may also be accessed by other applications executing on other systems. In this case, a mechanism is needed to ensure that up-to-date data stored in the database for a given system is provided when that database is accessed by another system.

to. Conventionally, this may be achieved by synchronizing the databases for these two systems, e.g., by copying the tables in the database. However, since different databases may be implemented using different schemas, this mechanism for ensuring data integrity may not be able to exchange (up-to-date) object instances.

As can be seen, techniques that can be used to track and exchange changes to hierarchical objects between systems having different schemas are highly desirable.

SUMMARY OF THE INVENTION

The invention provides techniques to track and publish changes to object instances. In an aspect, a data structure is provided to facilitate the exchanges of object instances. In an embodiment, the data structure includes a snapshot used to capture the state of an object instance, a delta snapshot used to capture changes to be published from one system to another system, a snapshot table used to store all generated snapshots, and a snapshot admin table used to store information indicative of prior exchanges for each object instance having a snapshot stored in the snapshot table.

In another aspect, processes are provided to publish object instances from a first system and to receive the published object instances at a second system. For an "outbound process" to publish object instances, a list of one or more object instances is initially received. For each object instance, a determination is made whether or not the object instance has changed since it was last published (if at all). And for each object instance that has changed since last published, a delta snapshot is generated for the changed object instance and includes data indicative of the changes between a current version and a last published version of the object instance. Delta snapshots for all changed object instances are then published to the second system.

For an "inbound process" to receive the object instances, the published delta snapshots are initially received. For each received delta snapshot, the object instance corresponding to the delta snapshot is retrieved and updated with the changes included in the delta snapshot. A snapshot is also generated for each updated object instance such that the received changes are registered so that they are not republished.

The invention further provides other methods, computer program products, and systems capable of implementing various aspects, embodiments, and features of the invention, as described in further detail below.

The foregoing, together with other aspects of this invention, will become more apparent when referring to the following specification, claims, and accompanying drawings.

DESCRIPTION OF THE SPECIFIC EMBODIMENTS

Figure 1:
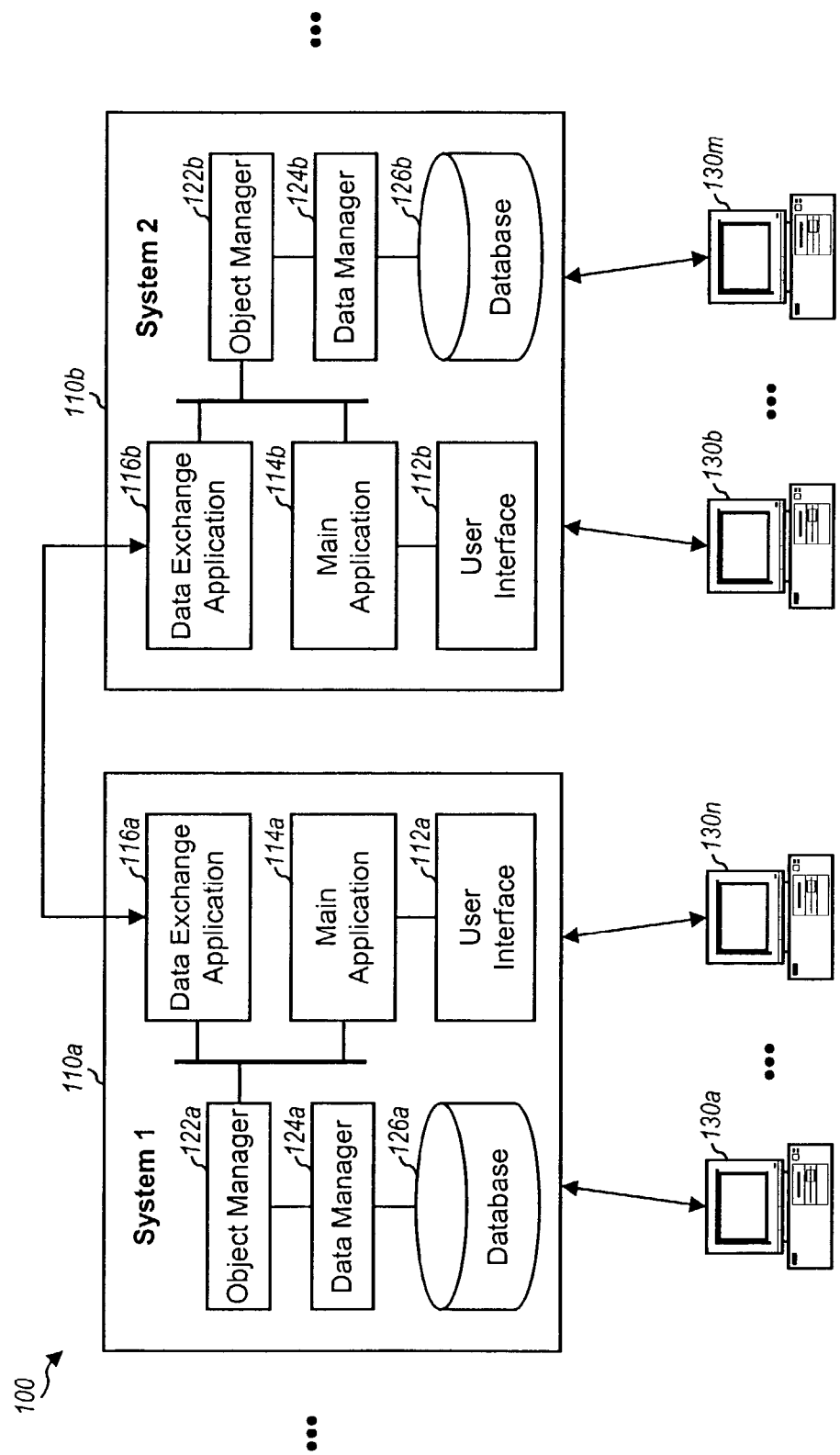
FIG. 1 is a diagram of an embodiment of a computer network wherein various aspects and embodiments of the invention may be implemented.

FIG. 1 is a diagram of an embodiment of a computer network 100 wherein various aspects and embodiments of the invention may be implemented. Network 100 comprises a number of systems 110 that may interact with a number of clients 130 and with each other via various channels (only two systems 110 are shown in FIG. 1 for simplicity). First and second systems 110a and 110b may represent two independent systems implemented on two sets of servers. Systems 110a and 110b may also represent a logical view of two instances of the same system during normal operation, or two versions of the same system during a database upgrade process. Systems 110a and 110b may be implemented with the same or different system architectures. A specific system architecture is described below for both systems 110a and 110b.

Each system 110 may include various top-level applications such as a main application 114, a data exchange application 116, and so on. Main application 114 includes various software applications that provide various functions (e.g., CRM) being supported by the system. Main application 114 interfaces with clients 130 via a user interface module 112 that provides an interface with end-users via a set of screens, which may be used to display various menus, forms, and other representations. These menus, forms, and so on, are typically generated by corresponding applets, which are high-level objects. Data exchange application 116 facilitates the exchange of object instances between systems 110a and 110b, and further ensures that up-to-date data is provided whenever requested by the other system. Other top-level applications may also be supported by each system but are not shown in FIG. 1 for simplicity.

The top-level applications further interface with a database 126 via an object manager 122 and a data manager 124. Object manager 122 interacts with the top-level applications and provides the necessary data, e.g., for the screens being rendered. Object manager 122 further exchanges data between the top-level applications and data manager 124, as appropriate. Data manager 124 manages database 126 and typically performs this function by invoking structured query language (SQL) objects. Database 126 stores data used by the top-level applications and provides and/or stores the data when and as requested. Database 126 typically implements a particular schema represented by the meta data.

Database 126 within each system 110 may be updated over time to reflect changes to the underlying physical data (e.g., as made by the top-level applications within each system 110). The top-level applications within each system may operate on object instances formed by the meta and physical data in the database maintained by the system, and may further operate on object instances formed by the meta and physical data in the database maintained by the other system. Data exchange application 116 facilitates the exchange of object instances between the systems. For each such exchange, application 116 determines whether or not changes have been made to each object instance to be exchanged, determines the changes (if any) to each object instance, and provides the changes or the updated object instance to the other system, as described below.

Figure 2A:
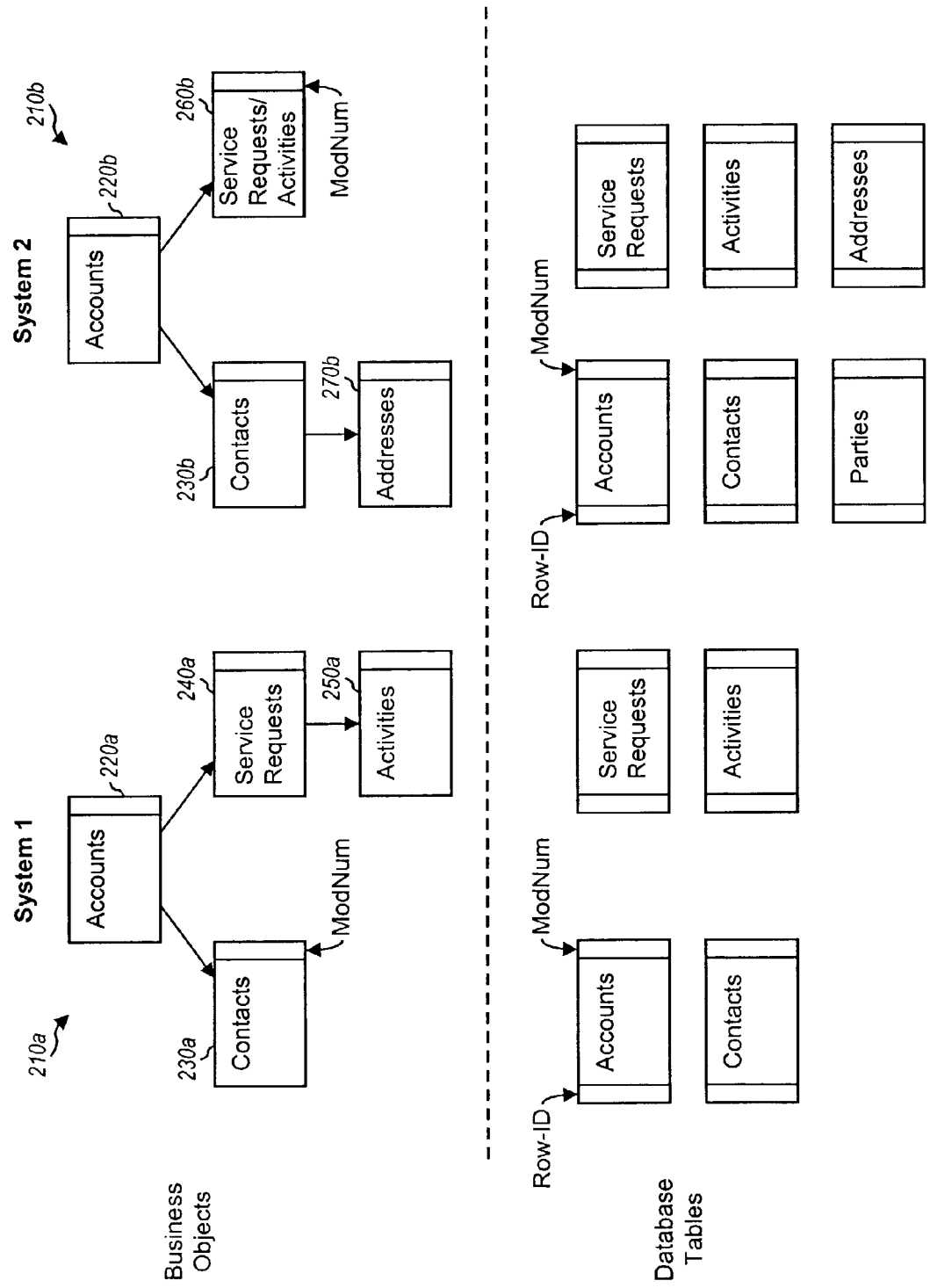
FIG. 2A is a diagram illustrating various representations for the data maintained by each system in the computer network.

FIG. 2A is a diagram illustrating various representations for the data maintained by each system 110. As noted above, each database 126 is associated with a particular schema and meta data. The schema describes the organization and format of the database (i.e., the physical structure of the database), and typically specifies a particular set of tables used to describe and identify the data stored in the database. The meta data defines the structure of the schema and comprises data about the underlying physical data. The meta data may thus be viewed as the data defining the various tables and their fields, and the relationship/association between the various tables and fields. The meta data may be included in the records for these tables, with each record representing a specific instance of an entity being represented by the table.

In the simple example shown in FIG. 2A, system 1 includes four tables used for four entities—Accounts, Contacts, Service Requests, and Activities, and system 2 includes six tables for six entities—Accounts, Contacts, Parties, Service Requests, Activities, and Addresses. Each table typically includes a number of fields for various types of information to be stored in the table for the associated entity. Each table typically further includes a number of records, with each record representing a specific instance of the associated entity (e.g., a specific account, contact, or activity). The tables may be implemented such that a field for one record in one table may reference another record in another table. For example, a particular Account in the Accounts table may include a reference to a particular Contact in the Contacts table.

FIG. 2A also shows examples of two different hierarchical structures for business objects 210a and 210b maintained by systems 1 and 2, respectively. Each business object comprises a hierarchical structure of business components. The business objects and components represent another (logical) view of the information stored in the database tables.

Each hierarchical structure includes a top-level business component for a particular entity (e.g., Accounts). The top-level business component may include a number of records, with each record corresponding to an instance of the business component. Each record of the top-level business component may be referenced by one or more records in one or more lower-level (e.g., child) business components, and each record in a child business component may further be referenced by one or more records in one or more lower-level (e.g., grandchild) components. Each record of a particular business component may thus be a parent component instance that may be referenced by a number of child component instances. The hierarchical structure may be defined to include any number of parent-child relationship layers, and may further be defined such that any component instance may be referenced by any number of lower-level component instances. Each component may also be viewed as an object that may reference and/or is referenced by other objects/components.

For business object 210a defined for system 1, a top-level business component 220a for the Accounts entity includes a number of records. Each Accounts record may be referenced by one or more records of a lower-level business component 230a for the Contacts entity, and may further be referenced by one or more records of a lower-level business component 240a for the Service Requests entity. Each Service Requests record may further be referenced by one or more records of a lower-level business component 250*a* for the Activities entity.

For business object 210*b* defined for system 2, a top-level business component 220*b* for the Accounts entity includes a number of records. Each Accounts record may be referenced by one or more records of a lower-level business component 230*b* for the Contacts entity, and may further be referenced by one or more records of a lower-level business component 260*b* for the Service Requests/Activities entity. Each Contacts record may further be referenced by one or more records of a lower-level business component 270*b* for the Addresses entity.

Figure 2B:
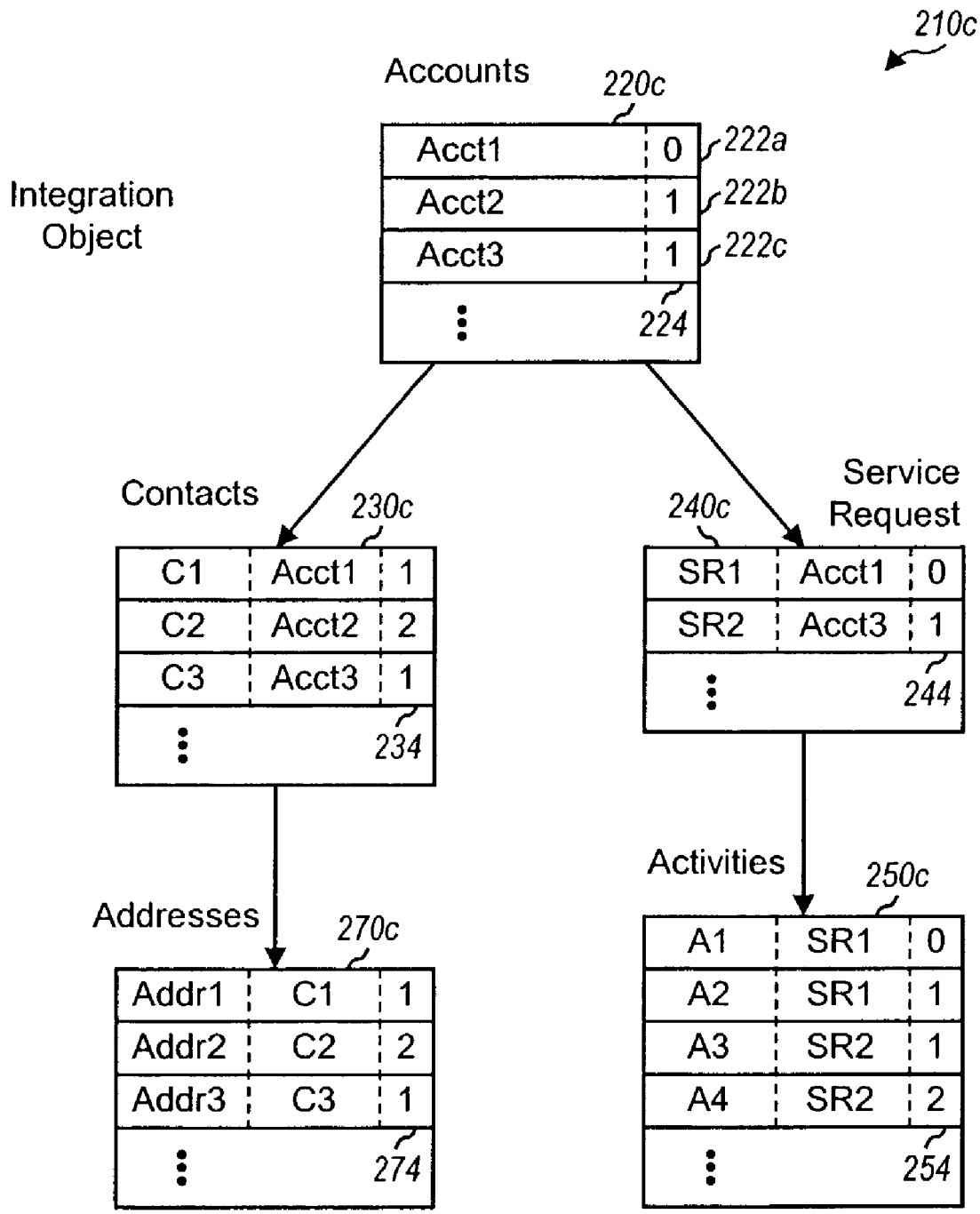
FIG. 2B shows an example of a hierarchical structure for an integration object that may be used to represent the business objects shown in FIG. 2A.

FIG. 2B shows an example of a hierarchical structure for an integration object 210*c* that may be used to represent business objects 210*a* and 210*b* in FIG. 2A. In general, an integration object is a canonical object that may be used to represent any type of object from various software vendors (e.g., a Siebel business object, SQL tables, and so on). An integration object may be created for each business object that may be published to, or received from, another system. In an embodiment, an integration object may be defined to include fields corresponding to all fields in the business object being represented. In another embodiment, an integration object may be defined to include only fields corresponding to those fields allowed to be published.

For integration object 210*c*, a top-level business component 220*c* for the Accounts entity includes a number of records 222, with each record corresponding to an instance of the business component. For example, records 222*a* through 222*c* represent three accounts Acct1 through Acct3, respectively. Each Accounts record 222 may be referenced by one or more records of a lower-level business component 230*c* for the Contacts entity, and may, further be referenced by one or more records of a lower-level business component 240*c* for the Service Requests entity. Each Contacts record may further be referenced by one or more records of a lower-level business component 270*c* for the Addresses entity, and each Service Request record may further be referenced by one or more records of a lower-level business component 250*c* for the Activities entity.

In the embodiment shown in FIG. 2B, each record in each business component includes an identifier (shown on the left side of the record for the component) used to identify the record. For example, records 222*a* through 222*c* are identified as Acct1 through Acct3. The identifier may be any designation (i.e., any combination of text and numerical values) used to specifically identify that record from among all records in the database.

In the embodiment shown in FIG. 2B, each record further includes a field (shown on the right side of the record) used to store a modification number (ModNum) for the object instance. For example, a field 224 is used to store the ModNum for the Accounts object instances, a field 234 is used to store the ModNum for the Contacts object instances, a field 244 is used to store the ModNum for the Service Requests object instances, and so on.

In an embodiment, the modification number identifies a specific version of the object instance, and this number is incremented whenever a modification is made to the object instance. In an embodiment, each system maintains the ModNum for each object instance stored within and/or maintained by the system. The ModNum may be used to determine whether or not an object instance has changed since it was last published. The ModNum may be used to detect whether or not changes have been made to an object instance by comparing the ModNums for the current and prior versions of the object instance. Alternatively, changes to an object instance may be detected by comparing the current and prior versions of the object instance field-by-field. The ModNum may also be maintained at the object, field, or some other level.

An integration object may be created using an application (e.g., a Tools application such as a "Meta Data Definition application") during the software design phase and provided with the main application. Thereafter, a run-time application may be used to allow an end-user (e.g., an administrator) to select which ones of the business objects in the database may be received and/or published and which fields of the business objects may be exchanged. An integration object may thus be defined to support "filtering" such that only certain fields of a business object are allowed to be exchanged.

Integration object instances (which are representative of business object instances) may be exchanged between systems 110*a* and 110*b* (i.e., "published" by one system and received by the other system). In an embodiment, the determination of whether or not to publish a particular integration object instance may be dependent on whether or not changes have been made to the integration object instance since it was last published. In an embodiment, the determination of what to publish may be dependent on a particular mode selected for processing the object instance, as described in further detail below.

In an embodiment, a "snapshot" of an integration object instance may be generated (e.g., by an "Adapter service") and used to capture the state of the object instance at a specific time instance. The snapshot would include information for and/or representative of the integration object instance at this time instance. For each exchange of object instances between two systems, a snapshot of each integration object instance to be published is generated and saved. Thereafter, this saved snapshot may be retrieved and used to determine whether or not changes have been made to the object instance since it was last published. The snapshot is one specific representation of the state of the integration object instance, and other representations may also be used and are within the scope of the invention.

In an embodiment, a "delta snapshot" of an integration object instance may be generated (e.g., by a "Snapshot service") and used to send information for the object instance. The delta snapshot may be generated based on the values in the integration object instance to be published, and may include all or only certain values needed to update the integration object instance at the receiving system. The delta snapshot is one specific representation of the changes to the integration object instance, and other representations may also be used and are within the scope of the invention. The snapshot and delta snapshot are described in further detail below.

Figure 3:
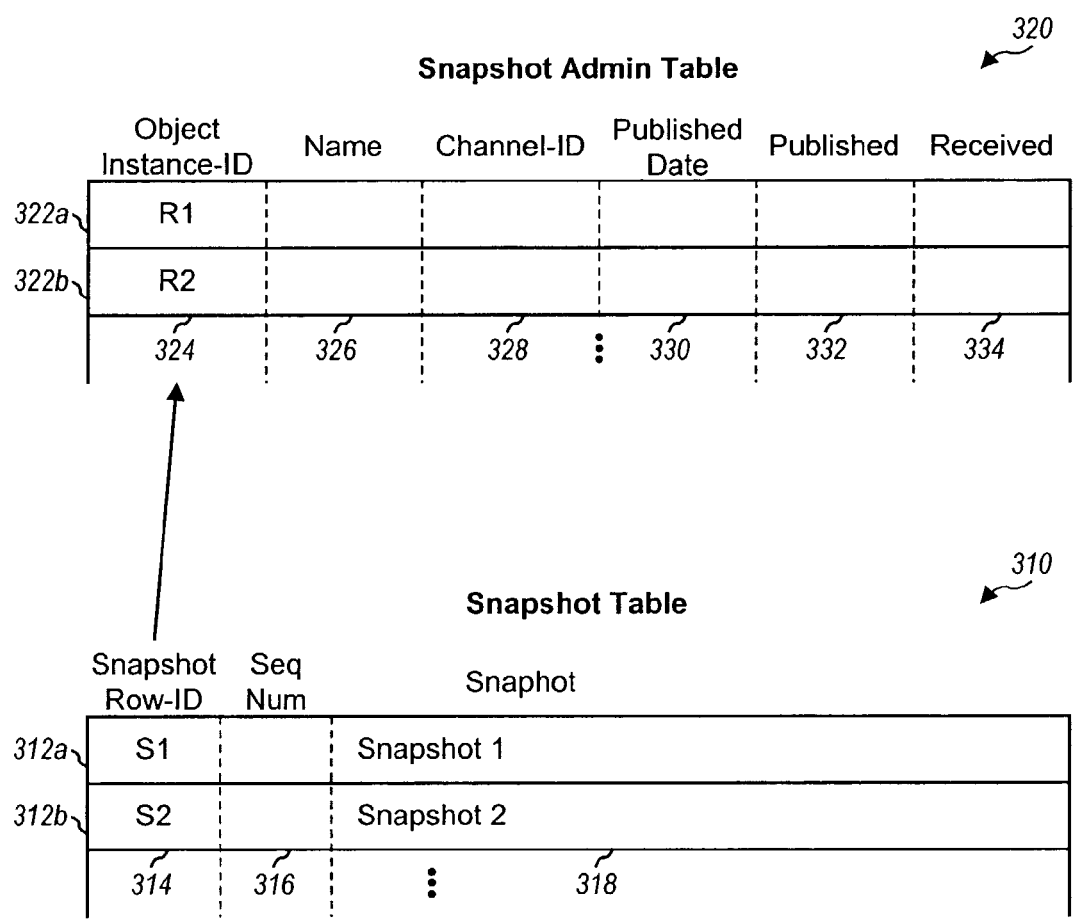
FIG. 3 is a diagram of a Snapshot table and a Snapshot Admin table used to facilitate the exchange of object instances.

FIG. 3 is a diagram of a Snapshot table 310 and a Snapshot Admin table 320 used to facilitate the exchange of object instances. Snapshot table 310 is used to store snapshots of integration object instances, and includes a record 312 for each snapshot being stored. In an embodiment, Snapshot table 310 includes a number of columns for the following fields: a snapshot row-ID 314, a sequence number 316 (SeqNum), and a snapshot 316 of an integration object instance. Snapshot row-ID 314 is the identifier for the snapshot in Snapshot Admin table 320, and may be used as a "foreign key" to link the snapshot to its integration object instance. Snapshot row-ID 314 may be passed as a parameter to a module used to retrieve a record from the Snapshot table, or to update or insert a record into the Snapshot table. Sequence number 316 is the sequence number for this section of the snapshot and is used to construct the final snapshot. Sequence number 316 may be used if the snapshot is partitioned into multiple sections. Snapshot 318 may be an extensible markup language (XML) document for the integration object instance, and is described in further detail below. Snapshot 318 is updated each time a new snapshot is generated or received for an integration object instance.

In an embodiment, to reduce the amount of data to be stored for each snapshot, only certain "key information" is stored in the snapshot for each component of an integration object instance. The key information may be used to determine whether or not the integration object component exists in the database tables, and to find the record for the component. In an embodiment, the key information (which is also referred to as "RMIOO" information) for each component includes a row-ID, a modification number (ModNum), an integration-ID, an owner-ID, and an operation (Oper). The row-ID identifies the specific row in the database table for the instance of the record. The modification number is a value indicative of the version of the component, as described above. The integration-ID is a key. The owner-ID identifies the owner of the component. In an embodiment, only the system designated as the owner of a component is able to make changes to the object instance. Ownership for each component/object may be static or may be dynamic (e.g., passed from one system to another). The operation identifies the specific operation to be performed on the object instance (e.g., update, insert, delete, or none) to transform the last published integration object instance to the current integration object instance.

In another embodiment, each snapshot includes an XML document that stores an image of the entire integration object instance, i.e., the values in all the fields of the integration object instance. In yet another embodiment, each snapshot only stores certain selected fields for the integration object instance. Other representations (besides XML) and other types of information may also be saved in the snapshot for the integration object instance, and this is within the scope of the invention. For example, the key information may be saved for each object instance, or for each field or an object instance.

Snapshot Admin table 320 is used to store the meta data about the snapshots stored in Snapshot table 310, such as the publication and reception information for integration object instances. In one embodiment, Snapshot Admin table 320 includes a record for each snapshot stored in Snapshot table 310. In an alternative embodiment, Snapshot Admin table 320 includes a record 322 for each integration object instance, regardless of whether or not the object instance has been published. In an embodiment, the information in table 320 is updated each time a snapshot is generated and each time a delta snapshot is published or received.

In an embodiment, Snapshot Admin table 320 includes a number of columns for the following fields: an object instance ID 324, a name 326, a channel-ID 328, a last published date 330, a Published flag 332, and a Received flag 334. Each record 322 in Snapshot Admin table 320 corresponds to, and stores information for, a particular snapshot for a particular integration object instance.

For each record in Snapshot table 310, snapshot row-ID 314 stores the row ID of the corresponding integration object instance whose meta data is stored in the Snapshot Admin table. For each instance, there is only one entry in the Snapshot Admin table for its meta data, there may be more than one record in the Snapshot table for many sections of the snapshot data, but with the same snapshot row-ID pointing to the same record in the Snapshot Admin table.

For each record in Snapshot Admin table 320, object instance ID 324 stores the unique ID of the corresponding integration object instance whose snapshot is stored in the Snapshot table. Name 326 stores the name of the integration object, which corresponds to the name of the business object. Channel-ID 328 stores the identity of the channel used to publish the integration object instance. Each channel may correspond to a particular communication means (e.g., a direct connection, a network, a wireless connection, and so on). The channel-ID, name, and snapshot row-ID are used to uniquely identify the snapshot. Last published date 330 stores the date and time of the last publication of the integration object instance. Published flag 332 is set to True if the snapshot has been published, and Received flag 334 is set to True if the integration object instance has been received.

In an alternative embodiment, Snapshot table 310 includes a field in each record to indicate whether or not the corresponding integration object instance is unpublished (e.g., the object instance has been changed but the changes have not yet been published from this system). Whenever changes are made to an object instance in the database after it has been published, the Unpublished field is set to True. Correspondingly, after an integration object instance has been published, the Unpublished field is updated accordingly (i.e., set to False). The Snapshot table may thus be used to maintain track of which integration object instances have not been published so that the proper integration object instances may be published when requested.

In one embodiment, Snapshot table 310 and Snapshot Admin table 320 are both stored in database 126. In another embodiment, Snapshot table 310 is stored in one or more files and Snapshot Admin table 320 is stored in the database. In yet another embodiment, Snapshot table 310 and Snapshot Admin table 320 are each stored in one or more files. The implementation choice for each of the Snapshot table and the Snapshot Admin table (e.g., database or file) may also be made selectable (e.g., by an administrator).

Other schemes to track changes made to object instances and to track publication and reception of object instances may also be used and are within the scope of the invention. In one such scheme, a transaction log table is maintained for each database, and each change to an object instance is logged to this table. The logging can be performed at various layers. For example, changes to individual fields of an object may be logged. The transaction log table may be implemented with a circular buffer structure. Whenever an object instance is changed, the changes are logged to the table and the table pointer is advanced. Whenever changes made to object instances are requested, all changes logged since the last update are sent. The pointer indicating the last published changes is then advanced to the current location in the table.

Figures 4A, 4B:
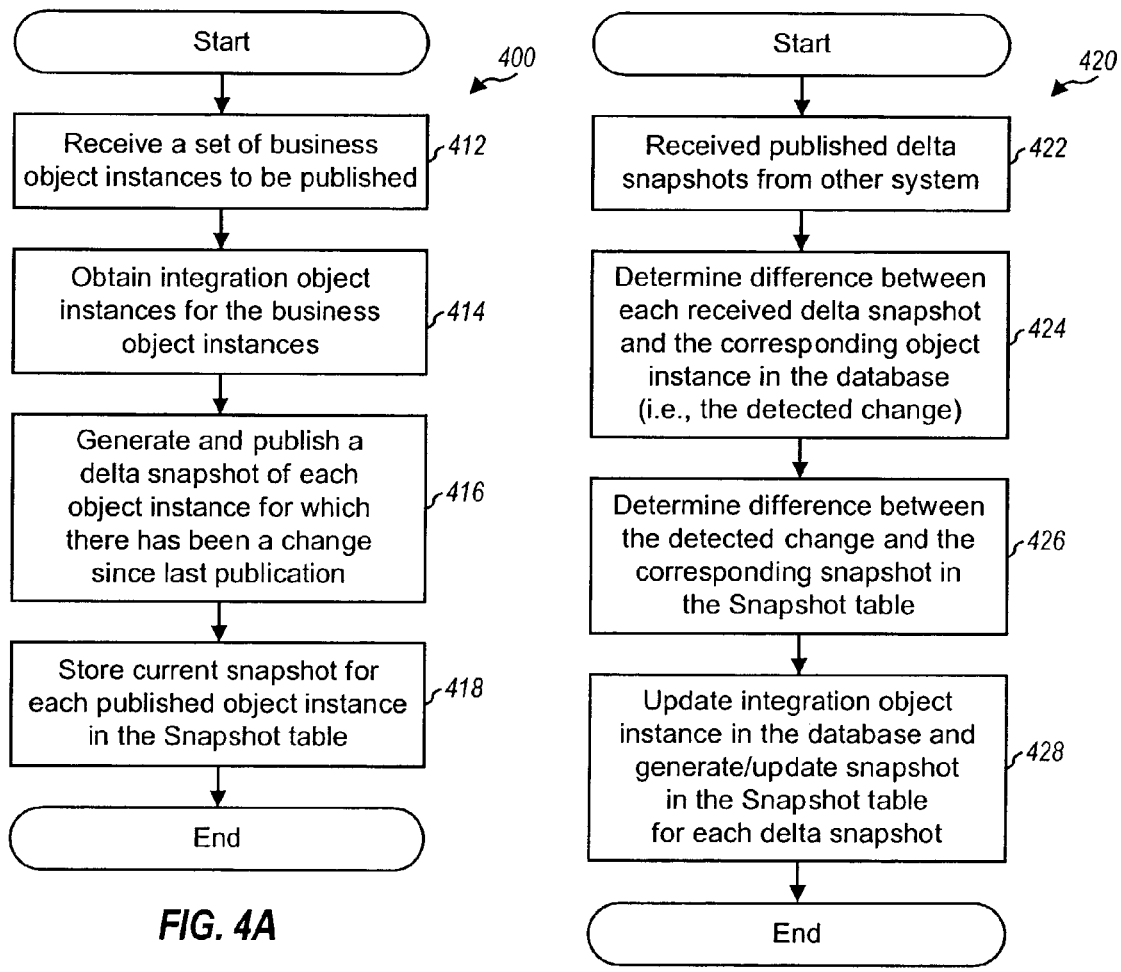
FIGS. 4A and 4B are flow diagrams of a specific embodiment of an outbound process to publish object instances from a first system and an inbound process to receive the published object instances at a second system, respectively.

FIG. 4A is a flow diagram of a specific embodiment of an "outbound" process 400 to publish object instances from a first system to a second system. Process 400 may be initiated by an end-user on either the first or second system, e.g., via a button provided in a user interface screen. Process 400 may also be initiated by the first system, e.g., automatically based on the occurrence of an event such as the detection of a change to an object. Process 400 may also be initiated by either system, e.g., periodically based on a timer maintained by a scheduler process. If Snapshot Admin table 320 stores information for integration object instances having generated snapshots but are not yet published (as supported by the embodiment described above), a software module may be designed to query the Snapshot Admin table for any integration object instances that have not yet been published, and to publish all unpublished integration object instances.

For the outbound process to publish object instances, the identities of a set of object instances to be published are initially received at the first system, at step 412. These identities may be obtained via a "visibility" process that determines which objects are to be published (or visible), as described below in FIG. 7. The identities may be the row IDs of the business component/integration component/database tables. Integration object instances are then obtained based on the row IDs, at step 414. This may be achieved by running a query on an Adapter module, which queries the database using an SQL-like language. For each integration object instance, changes since the last publication are detected. And for each integration object instance that has changed, a delta snapshot is generated and published to the second system, at step 416. A current snapshot for the object instance for each published delta snapshot is then stored to the Snapshot table, at step 418. The outbound process then terminates.

FIG. 4B is a flow diagram of specific embodiment of an "inbound" process 420 to receive object instances from the first system at the second system. For the inbound process to receive object-instances, the published delta snapshots from the first system are initially received, at step 422. For each received delta snapshot, the difference between the delta snapshot and the corresponding integration object instance in the database (i.e., the detected change) is first determined, at step 424. This may be achieved by invoking the Adapter service. The difference between the detected change and the corresponding snapshot in the Snapshot table is next determined, at step 426. Steps 424 and 426 effectively perform a three-way comparison between the received delta snapshot, the corresponding object instance in the database, and the corresponding snapshot in the Snapshot table. The comparison between these three items may also be dependent on whether a full or incremental snapshot has been received as the delta snapshot. For each received delta snapshot, the corresponding integration object instance and snapshot are each updated based on the determined differences, at step 428. The inbound process then terminates. The outbound and inbound processes are described in further detail below.

Figure 5:
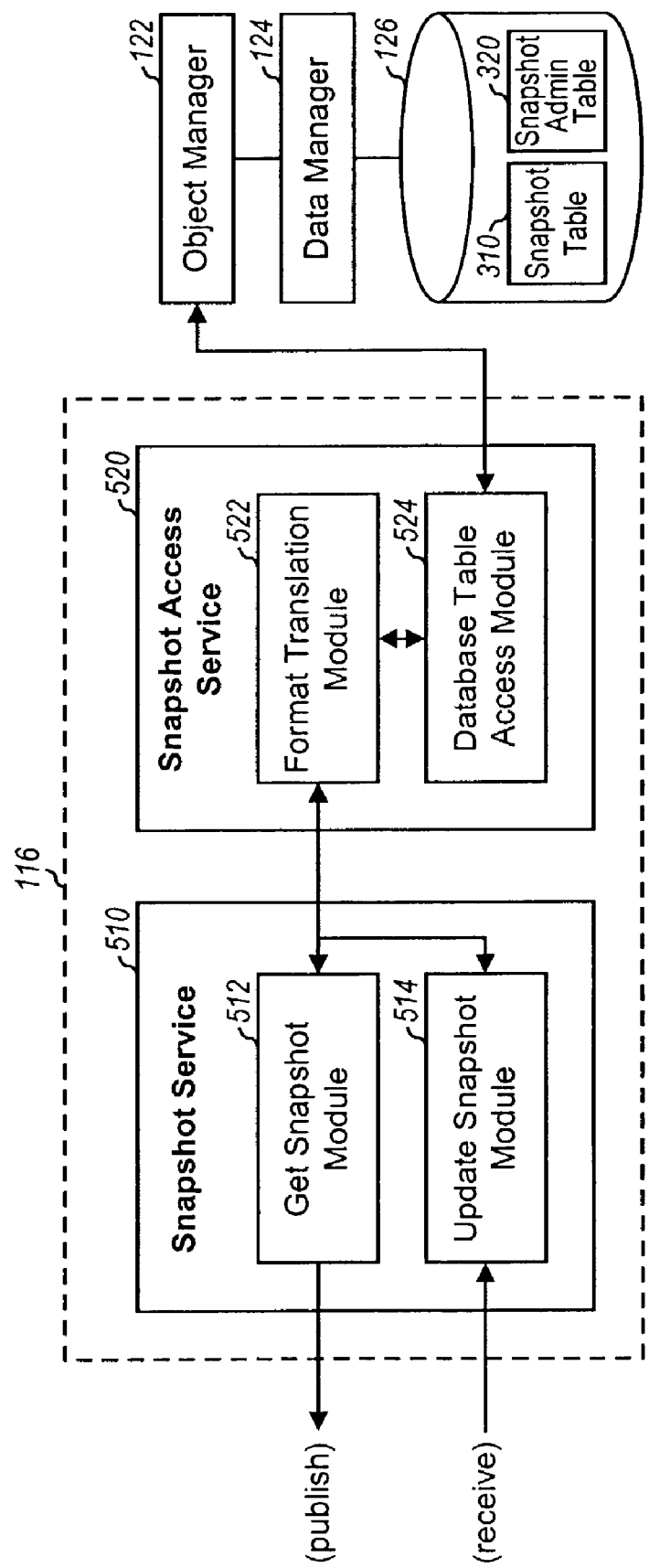
FIG. 5 is a block diagram of an embodiment of a snapshot access service capable of inserting, updating, and retrieving the snapshot stored in the database.

FIG. 5 is a block diagram of an embodiment of data exchange application 116, which is capable of identifying and exchanging incremental changes to a hierarchical object. In this embodiment, data exchange application 116 includes a Snapshot service 510 that interacts with a Snapshot Access service 520. As used herein, a "service" is a software module defined to implement a specific set of functionalities. Snapshot service 510 receives a list of integration object instances, compares each received object instance with the last snapshot of the instance, and generates a delta snapshot for each received object instance that has changed since the last snapshot. Snapshot Access service 520 manages the snapshots in Snapshot table 310 and further updates the publishing and receiving information stored in Snapshot Admin table 320. Snapshot Access service 520 also generates a delta snapshot for any previously stored snapshot which is no longer received with operation of delete.

Snapshot Service

In an embodiment, Snapshot service 510 includes a Get Snapshot module 512 used for the outbound process (i.e., publishing) and an Update Snapshot module 514 used for inbound process (i.e., receiving).

For an outbound the process to publish integration object instances, Snapshot service 510 receives the list of integration object instances and, for each object instance in the list, calls Get Snapshot module 512 to generate a delta snapshot for the object instance if it has changed since its last publication. Get Snapshot module 512 compares the integration object instance with a previously stored snapshot of the object instance (if any) to determine whether or not there are any changes since the last publication. The comparison may be performed in various manners, as described below. If there are any changes, then Get Snapshot module 512 provides a delta snapshot, which may also be generated in various manners, as described below. And for each previously stored snapshot that cannot be found in the received object instances, Get Snapshot module 512 generates a delta snapshot from the stored snapshot with the operation set to delete (Oper-Delete). Snapshot service 510 then publishes the delta snapshots for all integration object instances that have changed and stored the current snapshots for the published object instances back to the Snapshot table.

For an inbound process to receive integration object instances, Snapshot service 510 receives a list of delta snapshots and, for each delta snapshot, calls Update Snapshot module 514 to update the corresponding integration object instance. Update Snapshot module 514 compares the delta snapshot with a previously stored snapshot of the object instance (if any) to determine whether or not there are any changes made by the publishing system since the last update. The comparison may be performed in various manners, as described below. If there are any changes, then Update Snapshot module 514 generates a new snapshot for the object instance such that any changes made locally to the integration object instance are published during the next outbound process but the received changes are not published. Snapshot service 510 then calls Snapshot Access service 520 to update the snapshot in the Snapshot table.

In an embodiment, a number of snapshot comparison and output modes are supported. Each snapshot mode corresponds to a specific scheme used to compare an integration object instance and its corresponding snapshot (if any) and to report the detected changes in a delta snapshot. In an embodiment, the supported snapshot modes include full snapshot mode and a sub-level snapshot mode. The a full snapshot mode entails operating (e.g., detecting changes) on each integration object instance as a whole, and the sub-level incremental snapshot mode entails operating on lower-level elements of each integration object instance.

As shown in FIG. 2B, an integration object may include a number of components. Each component may further include a number of fields, each field may include a number of sub-fields, and so on. The components, fields, and sub-fields, and so on, may be viewed collectively as "sub-level elements" of the integration object. The comparison to detect changes may be performed on elements at any sub-level of an integration object, and the delta snapshot may also be generated to include the detected changes at any sub-level. In an embodiment, the sub-level incremental snapshot mode includes a component-level incremental snapshot mode and a field-level incremental snapshot mode.

For the full snapshot mode, changes to an integration object instance are detected at the object level (i.e., the entire integration object). If there is any change to any component or field of the integration object instance, then a delta snapshot of the entire integration object instance is generated and published.

For the component-level incremental snapshot mode, changes to an integration object instance are detected at the component level. Referring back to FIG. 2B, an integration object instance is formed as a hierarchical structure of components (e.g., components for Accounts, Contacts, Addresses, Service Requests, and Activities). For this mode, changes are detected for each pair of components, and newly added and/or deleted components are also detected as changes. If any component has changed, then a delta snapshot with all components that have changed is generated and published. To maintain a uniform structure, components that have not changed may also be represented in the delta snapshot. However, to reduce the amount of data to be included in the delta snapshot, only key information (described above) is included for each component that has not changed. And for each component that has changed, all fields along with the key information are included in the delta snapshot.

For the field-level incremental snapshot mode, changes to an integration object instance are detected at the field level. Each component may include a number of fields (e.g., for First Name, Last Name, Phone Number, and so on, for a Contact component). For this mode, changes are detected for each pair of fields. If any field in the integration object instance has changed, then a delta snapshot with fields that have changed is generated and published. Again, to maintain a uniform output structure, fields that have not changed may also be represented in the delta snapshot. Again, to reduce the amount of data to be included in the delta snapshot, only key information may be included for each field that has not changed, while all fields in the integration object instance that have changed are included in the delta snapshot.

In an embodiment, the Snapshot service can be directed to operate based on any one of the supported snapshot modes, and the specific snapshot mode to be used for each outbound and inbound process is identified via a Snapshot Mode parameter defined for the Snapshot service.

In an embodiment, the comparison to detect changes to an integration object instance is achieved via the modification number (ModNum) maintained for each component. This ModNum is stored for each component in a snapshot and is also stored in the database tables used to form the integration object instance, as shown in FIG. 2A. Whenever a change is made to any field in a component, the ModNum in the database tables for the component is incremented (e.g., by one). When a snapshot of an integration object instance is created, the current ModNum in the database table for each component in the integration object instance is saved in the snapshot. In this way, any changes to a component may be easily detected by comparing the current ModNum in the database table to the ModNum saved in the snapshot.

Figure 6:
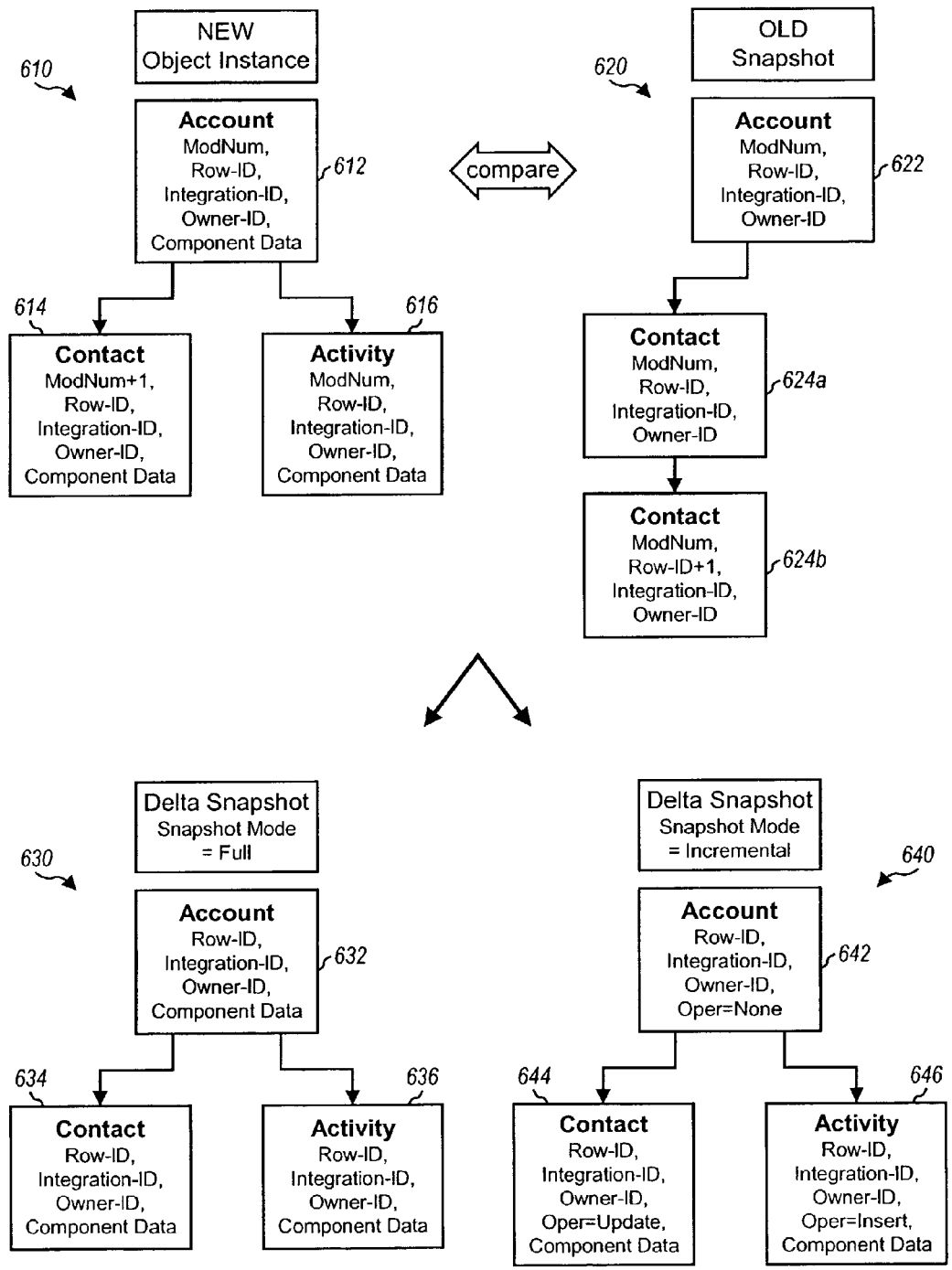
FIG. 6 is a diagram that illustrates the (component-level) comparison to detect changes between a new integration object instance and its saved snapshot.

FIG. 6 is a diagram that illustrates the (component-level) comparison to detect changes between a new integration object instance 610 and its saved snapshot 620. In this example, integration object instance 610 includes an Account component 612, a Contact component 614, and an Activity component 616; and snapshot 620 includes an Account component 622 and Contact components 624a and 624b. Account component 612 has not changed and includes the same ModNum as that of the saved Account component 622. Contact component 614 has changed and its ModNum is different (incremented) from that of the corresponding Contact component 624a. Contact component 624b has been deleted from integration object instance 610, and Activity component 616 has been added.

Depending on the particular snapshot mode selected, the Snapshot service may provide a delta snapshot that is either a full snapshot 630 or a (field-level or component-level) incremental snapshot 640. As shown in FIG. 6, full snapshot 630 includes all fields and key information for each component in the newer integration object instance 610. The ModNum is maintained by the publishing system, and is included in full snapshot 630. Incremental snapshot 640 also includes all components in the new integration object instance 610. However, each component in incremental snapshot 640 includes an indication of the specific operation to be performed for that component (e.g., no change to component 642, update component 644 in the old integration object instance, and insert new component 646 to the old integration object instance). In one embodiment, a deleted component (e.g., component 624b) is not included in incremental snapshot 640. In another embodiment, a deleted component is represented in the delta snapshot with its key information and the operation is set to delete (Oper=Delete). For a component that has not changed (e.g., Account component 642), only key information may be included in incremental snapshot 640 and component data may be omitted.

Snapshot Access Service

FIG. 5 also shows an embodiment of Snapshot Access service 520, which includes (1) a Format Translation module 522 used to perform conversion between an internal database representation and a published representation for the integration object instances and (2) a Database Table Access module 524 used to retrieve, insert, delete, and update integration object instances and snapshots stored in the database and to further manage Snapshot Admin table 320. In an embodiment, XML streams (or documents) are used as the published representation for the integration object instances.

Format Translation module 522 performs the conversion between integration object instances and XML streams, and is able to receive an in-memory data stream and convert it into an XML string or document. In an embodiment, module 522 generates an XML stream that includes only the key information for each component.

Database Table Access module 524 performs the following functionality:

Insert a snapshot—add a snapshot to the Snapshot table. In an embodiment, the snapshot is added only if it is generated for the first time, and the integration object instance may also be published (if selected) when the snapshot is generated.

Retrieve a snapshot—retrieve a specific snapshot from the Snapshot table based on the unique identifying information (described below). The publishing information for the snapshot is also retrieved from the Snapshot Admin table. An option may be provided such that only snapshots that have not yet been published may be retrieved.

Update a snapshot—replace an existing snapshot in the Snapshot table with a new snapshot. The publishing and/or receiving information for the snapshot may also be updated in the Snapshot Admin table.

Delete a snapshot—delete a specific snapshot from the Snapshot table and its record from the Snapshot Admin table.

As shown in FIG. 5, Database Table Access module 524 accesses Snapshot table 310 and Snapshot Admin table 320 in database 126 via object manager 122 and data manager 124.

In an embodiment, the unique identifying information used to uniquely identify a snapshot includes the row-ID of an integration object instance, the name of the integration object, and the channel-ID of the channel used to publish/receive the snapshot.

Figure 7:
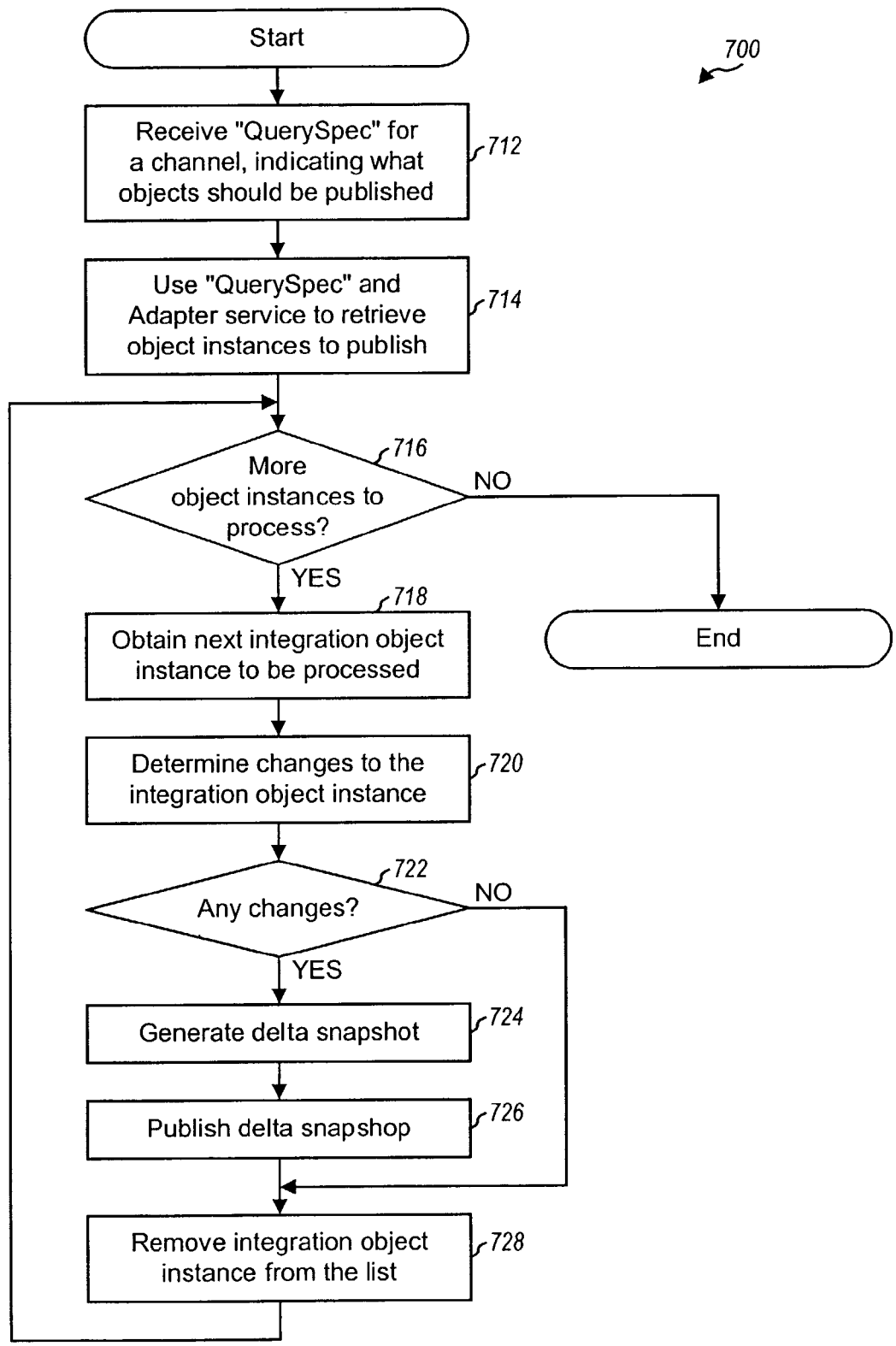
FIG. 7 is a flow diagram of an embodiment of an outbound process to publish a list of object instances from a first system to a second system.

FIG. 7 is a flow diagram of an embodiment of an outbound process 700 to publish a list of object instances from a first system to a second system. Process 700 may be used to implement outbound process 410 in FIG. 4.

Initially, a list of objects to be published is received, at step 712. A query specification ("QuerySpec") may be received for a particular channel, and this QuerySpec would indicate in a declarative way what objects should be published for the channel. The QuerySpec may thus be used to implement a visibility process that determines which objects are to be published (or visible). The QuerySpec and Adapter service are then used to retrieve object instances for publishing and their row-IDs, at step 714. The Adapter service receives the QuerySpec as a parameter and executes the workflow for each object instance matching the QuerySpec.

A determination is then made whether or not there are any object instances to be processed, at step 716. If the answer is yes, then the next integration object instance in the list is obtained, at step 718. This may be achieved by invoking a Query Adapter module. Changes to the integration object instance are then detected, at step 720. The logic to detect changes for the outbound process is shown in Table 1. If there are no changes to the integration object instance since the last published version of the object instance, then the process proceeds to step 728. Otherwise, a delta snapshot of the object instance is generated, at step 724. Depending on the selected snapshot mode, the delta snapshot may be a full snapshot or a (e.g., component-level or field-level) incremental snapshot. The delta snapshot is then published to the second system, at step 726. Steps 720, 722, 724, and 726 may be performed by the Snapshot service. The integration object instance just processed is then removed from the list, at step 728, and the process returns to step 716.

Back at step 716, if all integration object instances in the list have been processed, then the process terminates.

Figure 8:
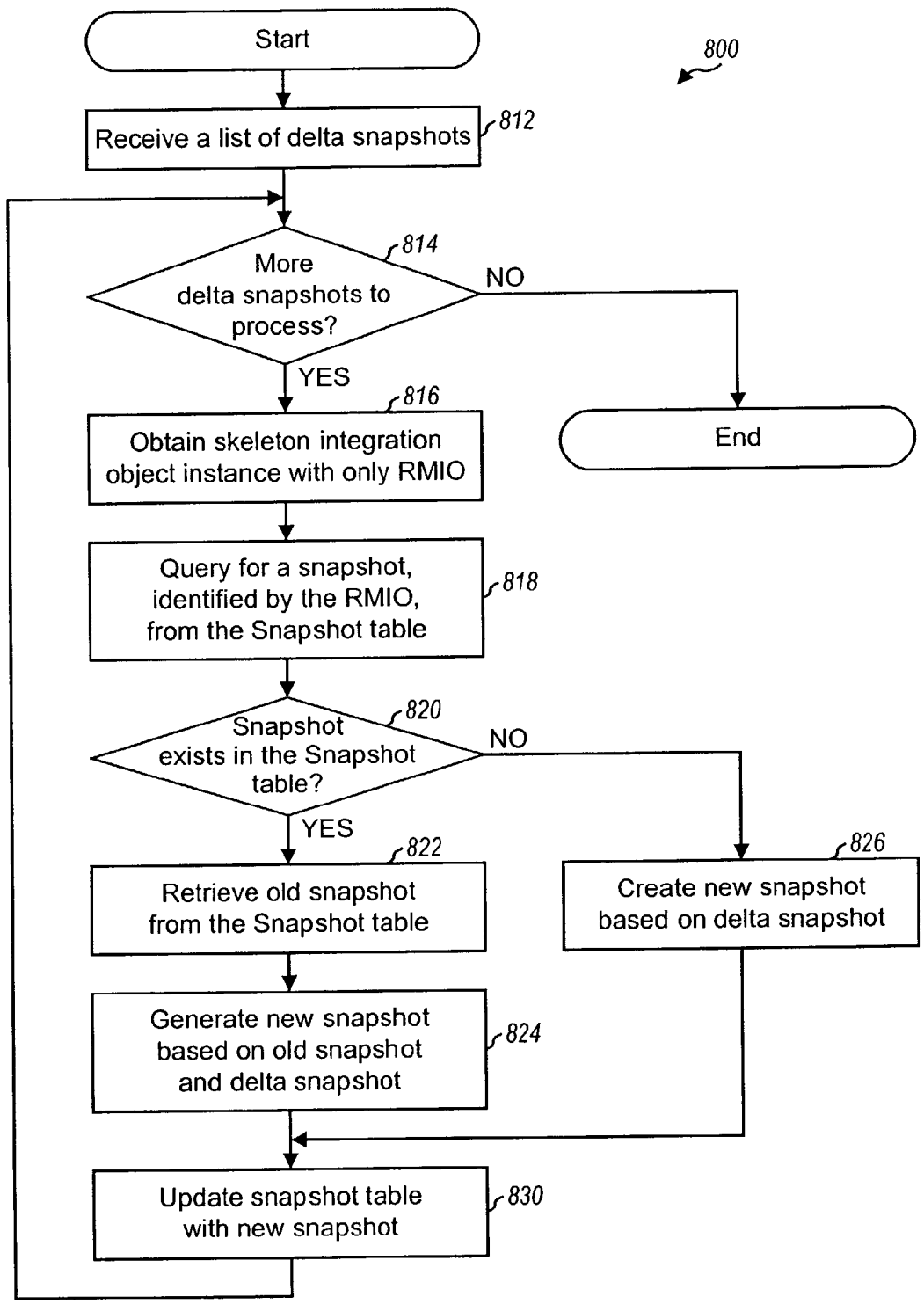
FIG. 8 is a flow diagram of an embodiment of an inbound process to receive at the second system a list of integration object instances published by the first system.

FIG. 8 is a flow diagram of an embodiment of an inbound process 800 to receive at a second system a list of integration object instances published by a first system. Process 800 may be used for inbound process 420 in FIG. 4.

Initially, a list of delta snapshots is received from the first system, at step 812. A determination is then made whether or not any delta snapshot needs to be processed, at step 814. If the answer is yes, then an unprocessed delta snapshot is selected and identifying information for the delta snapshot is obtained, at step 816. This may be achieved by invoking an Upsert Adapter module, which returns a "skeleton" integration object instance with only the RMIO information (row-ID, ModNum, integration-ID, and operation) as the identifying information for the delta snapshot. The RMIO information may then be used to query whether or not a snapshot for this integration object instance has been saved in the Snapshot table, at step 818.

The RMIO information may be used to determine whether or not changes have been made to the integration object instance corresponding to the delta snapshot. The difference between the delta snapshot and the corresponding integration object instance may be determined by the Adapter service. If changes were made, then the integration object instance is updated accordingly.

A determination is then made whether or not the snapshot exists in the Snapshot table, at step 820. If the snapshot does exist, then the existing (old) snapshot is retrieved from the Snapshot table, at step 822. A new snapshot is then generated based on the newly updated integration object instance and the old snapshot, at step 824. The new snapshot is generated such that the changes just received in the delta snapshot are noted and not published again, and the changes made by the second (local) system are published at the next publication instance. This may be achieved by selecting a value for ModNum for the new snapshot such that it is higher than the ModNum value in the old snapshot but lower than the ModNum value in the integration object instance. Alternatively, if the snapshot does not exist at step 820, a new snapshot is generated such that the values in the integration object instance just received are not published later, and the changes made by the local system are published at the next publication instance. The logic to detect changes for the inbound process is shown in Table 2. The Snapshot table is then updated with the new snapshot, at step 830. Steps 818, 820, 822, and 830 may be performed by the Snapshot Access service, and steps 824 and 826 may be performed by the Snapshot service.

The process then returns to step 814. Back at step 814, if all delta snapshots have been processed, then the process terminates.

Figure 9A:
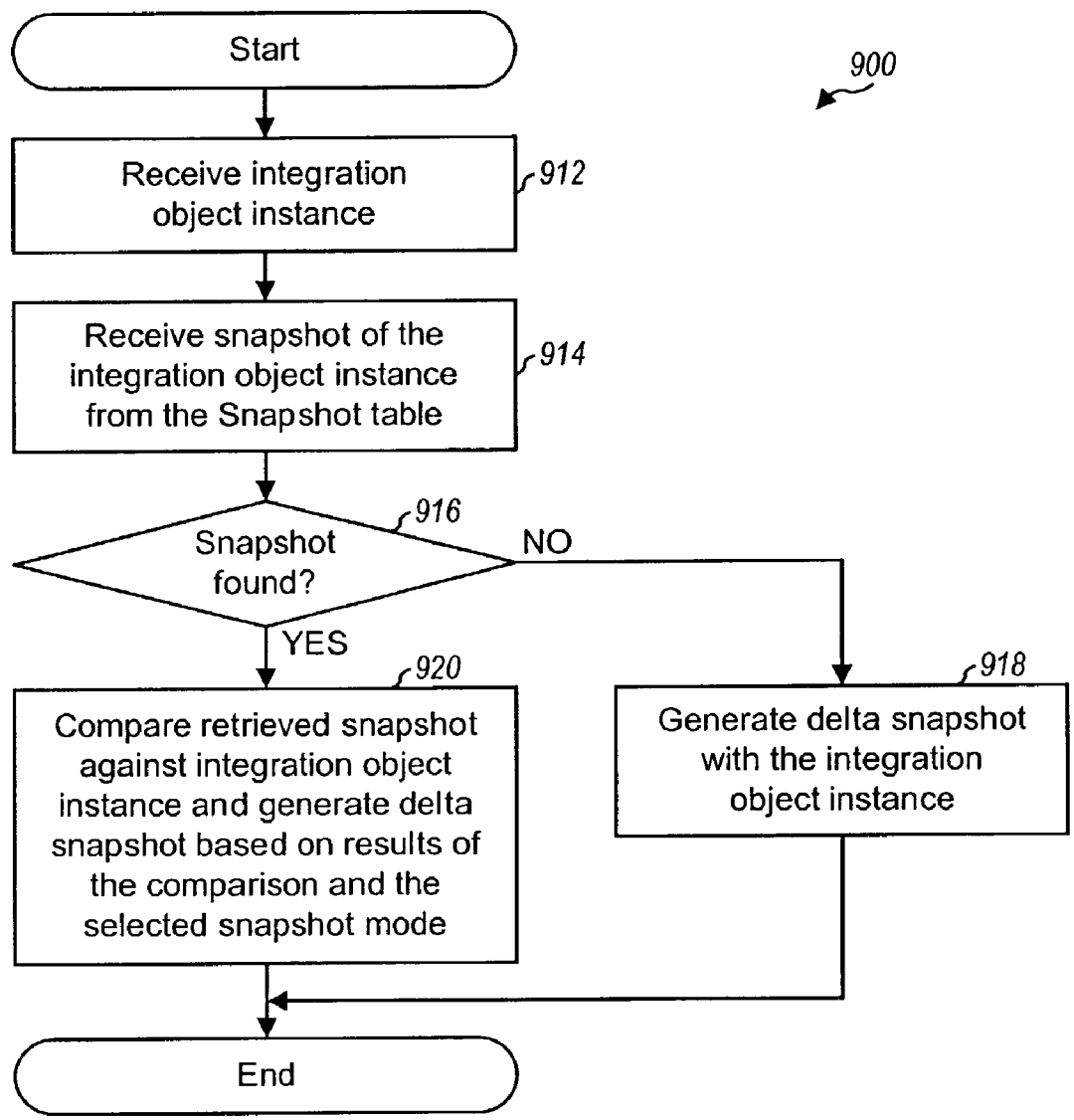
FIG. 9A is a flow diagram of an embodiment of a process performed by a Snapshot service to generate a delta snapshot for an integration object instance.

FIG. 9A is a flow diagram of an embodiment of a process 900 performed by the Snapshot service to generate a delta snapshot for an integration object instance. Process 900 may be used for step 724 in FIG. 7. Initially, the integration object instance is received, at step 912, and the snapshot of this object instance is retrieved from the Snapshot table, at step 914. Step 914 may be achieved by invoking the Snapshot Access service. If the snapshot is not found in the Snapshot table, as determined in step 916, indicating that the integration object instance has never been published, then a delta snapshot is generated by copying the entire integration object instance into the delta snapshot, at step 918.

Otherwise, if the snapshot is found in the Snapshot table, at step 916, then the retrieved snapshot is compared against the integration object instance, at step 920. The comparison is performed based on the selected snapshot mode (e.g., full, component-level incremental, or field-level incremental snapshot). A delta snapshot is then generated based on the results of the comparison and the selected snapshot mode, also at step 920. Step 920 is described in further detail below in FIG. 9B. The process then terminates.

Figure 9B:
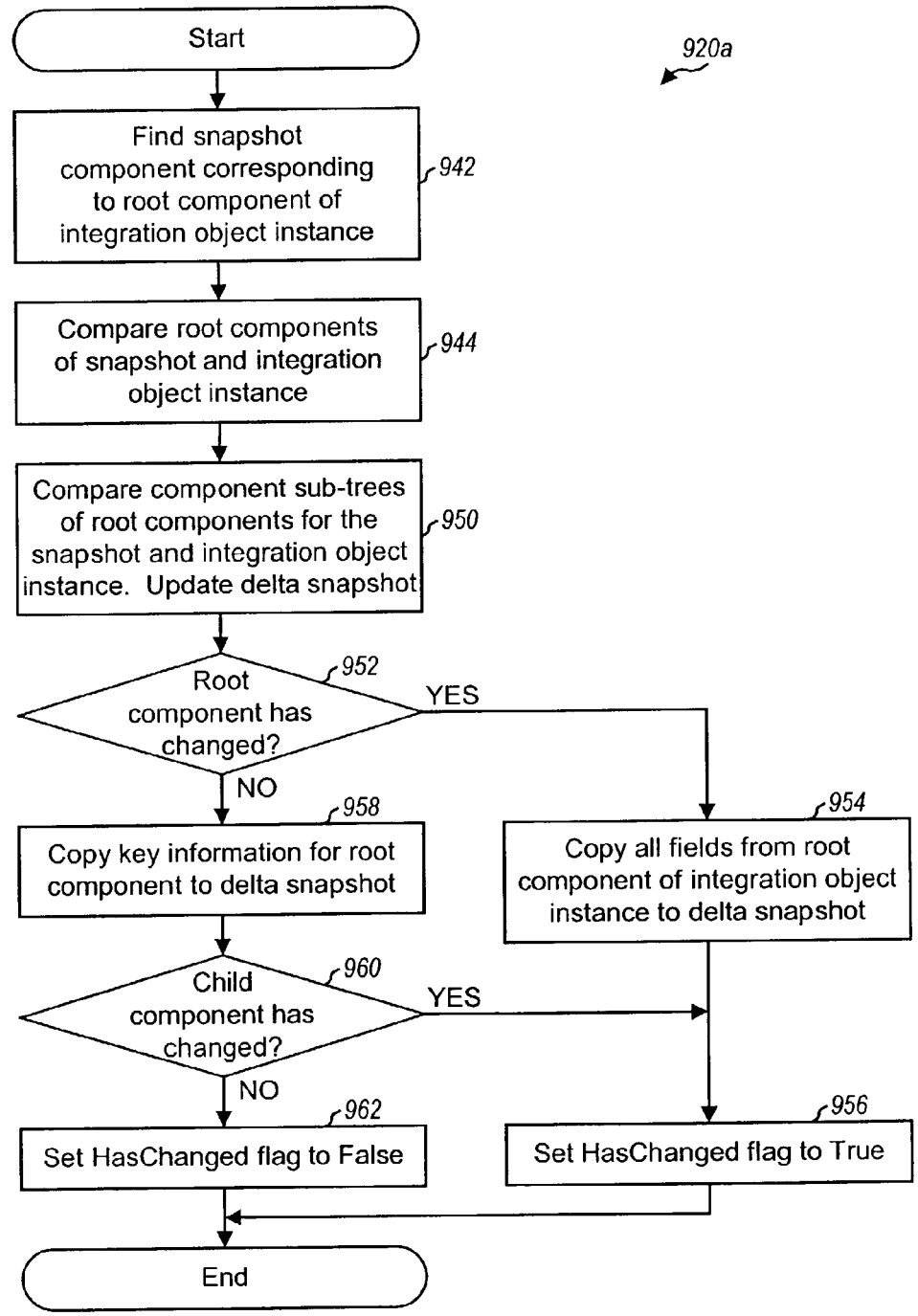
FIG. 9B is a flow diagram of an embodiment of a process to compare an old snapshot against a new integration object instance and to generate the delta snapshot based on the results of the comparison.

FIG. 9B is a flow diagram of an embodiment of a process 920a that may be performed for step 920 to compare an existing (old) snapshot against a (new) integration object instance and to generate a delta snapshot based on the results of the comparison.

Initially, the component in the snapshot corresponding to the root (or top-most level) component in the integration object instance is found, at step 942. In an embodiment, the row-ID (object-ID) or integration-ID of the root component in the integration object instance is used to find the corresponding root component in the snapshot. Other mechanisms to find the snapshot component may also be used.

The root components for the snapshot and integration object instance are then compared to determine whether there have been any changes to the integration object instance, at step 944. In an embodiment, changes are detected by comparing the ModNum stored in the snapshot for the component and the ModNum stored in the database tables for the integration object instance. The comparison may also be performed based on the ModNums for the fields, if the field-level incremental snapshot mode is selected. The logic used to detect changes to the integration object instance is shown in Table 1.

The entire component sub-tree (i.e., below the root component) for the snapshot is then compared against the component sub-tree for the integration object instance, at step 950. Based on the results of the comparison, the delta snapshot is also updated accordingly, also at step 950. Step 950 is described in further detail below in FIG. 9C.

A determination is then made whether or not the root component of the integration object instance has changed, at step 952. If the root component has changed, then all fields for the root component in the integration object instance are copied to the delta snapshot (if the full snapshot or component-level incremental snapshot mode is selected) or only the changed fields are copied (if the field-level incremental snapshot mode is selected), at step 954. A HasChanged flag used to indicate whether or not the integration object instance has changed since the last publication is set to True, at step 956, and the process then terminates. Otherwise, if the root component has not changed, as determined in step 952, then the key information for the root component of the integration object instance is copied to the root component in the delta snapshot (if incremental snapshot mode is selected), at step 958.

A determination is then made whether or not a child component has changed, at step 960. If a child component has changed, then the HasChanged flag is also set to True, at step 956. Otherwise, if no child component has changed, then the HasChanged flag is set to False, at step 962. In either case, the process then terminates.

If the full snapshot mode is selected, the comparison can stop upon detection of the first change, and the entire integration object instance is then copied to the delta snapshot. And if the incremental snapshot mode is selected (e.g., at the component or field level), then the comparison is exhaustive to find all elements (e.g., components or fields) that have changed and to add them to the delta snapshot.

Figure 9C:
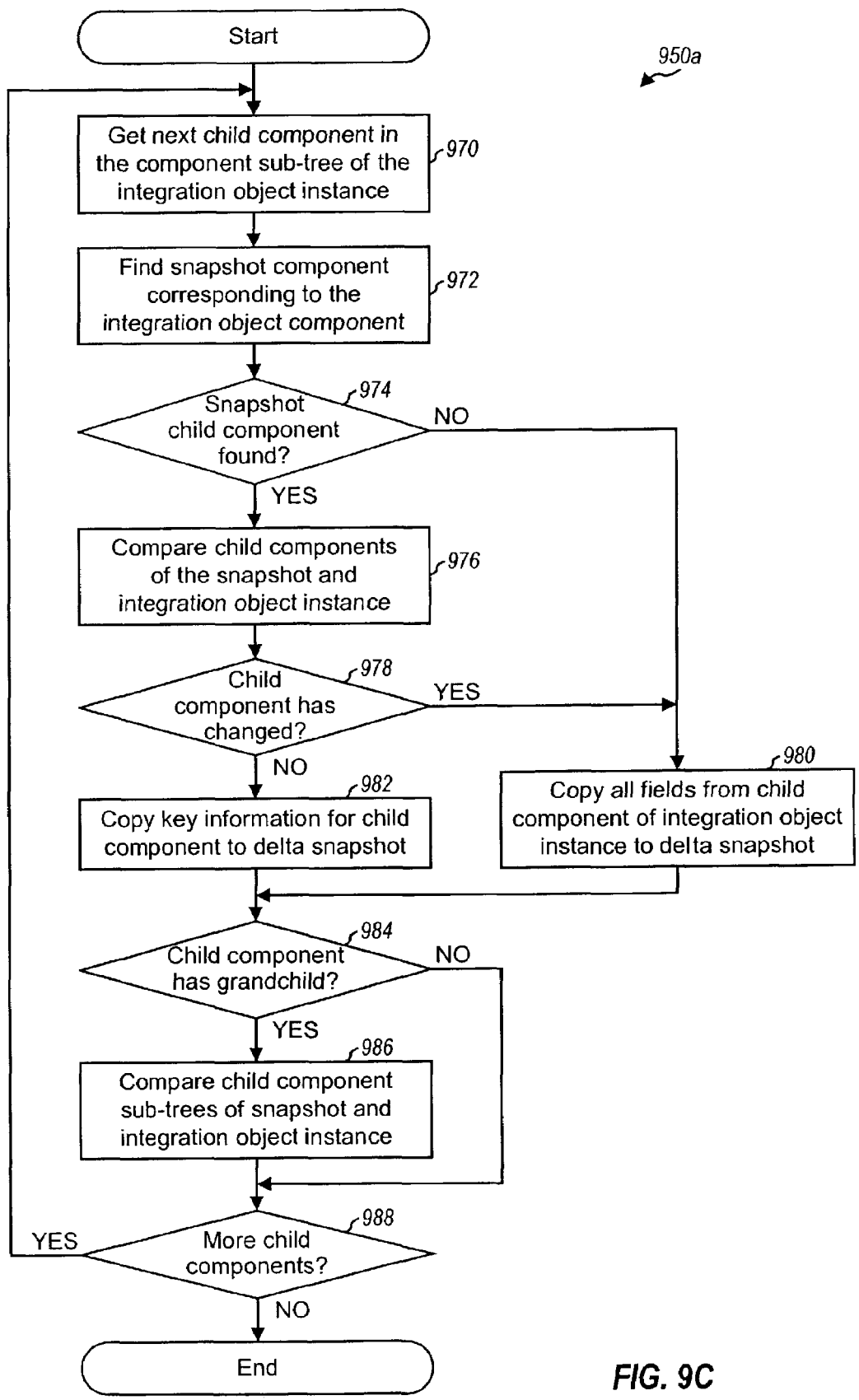
FIG. 9C is a flow diagram of an embodiment of a process to compare component sub-trees of an old snapshot and a new integration object instance.

FIG. 9C is a flow diagram of an embodiment of a process 950a that may be performed for step 950 to compare a component sub-tree of an old snapshot against a component sub-tree of a new integration object instance, and to update the delta snapshot accordingly based on the results of the comparison. The component sub-trees may be compared via a two-step process. First, the components at the top-most level of the sub-trees are compared to determine changes at that level. Second, the children of each component are compared to determine changes at the next lower level. The second step may also be performed by calling the same process 950a. In this way, process 950a may be called recursively as many times as needed to process lower-level component sub-trees.

For the first step, the next (unprocessed) child component in the sub-tree for the integration object instance is selected for processing, at step 970. The component in the snapshot corresponding to the selected child component in the integration object instance is then searched, at step 972. This may be achieved based on the row-ID or integration-ID, similar to that described above for step 942.

A determination is then made whether or not the corresponding child component was found in the snapshot, at step 974. If the child component was not found, indicating that this component has been added since the last publication of the integration object instance, then the child component in the integration object instance is copied to the delta snapshot, at step 980. The operation for this component is set to insert (Oper=Insert). Otherwise, if the child component was found in the snapshot, then the pair of corresponding child components of the snapshot and the integration object instance are compared to determine whether or not there have been any changes, at step 976. Changes may be detected by comparing the ModNum stored for the component in the snapshot and the ModNum stored in the database tables for the integration object instance. Again, the logic for the comparison is shown in Table 1.

A determination is then made whether or not the child component has changed, at step 978. If the child component has changed, then all fields (or only the changed fields, depending on the selected snapshot mode) for the child component in the integration object instance are copied to the child component in the delta snapshot, at step 980. The operation for this component is set to update (Oper=Update). Otherwise, if the child component has not changed, then the key information for the child component of the integration object instance is copied to the child component in the delta snapshot (if incremental snapshot mode is selected), at step 982. The operation for this component is set to none (Oper-None).

For the second step, a determination is made whether or not the child component of the integration object instance has any grandchild, at step 984. If the answer is yes, then process 950a is called again to process the child component sub-trees of the integration object instance and the snapshot, at step 986. Otherwise, step 986 is skipped.

A determination is then made whether or not there are any more child components in the top-most level of the component sub-tree for the integration object instance, at step 988. If the answer is yes, then the process returns to step 970 and another child component is selected and processed. Otherwise, the process terminates.

For the embodiment in which components that have been deleted from the integration object instance are also represented in the delta snapshot, process 950a can be modified such the old snapshot is also checked for any components not found in the new integration object instance. For each such deleted component, the key information for the component may be included in the delta snapshot, with the operation set to delete (Oper=Delete).

Table 1 shows the logic for the component-level comparison between the old snapshot and the new integration object instance for the outbound process.

TABLE 1

| Snapshot State | Action | New Object Instance Component | Old Snapshot Component | Output Component |
| --- | --- | --- | --- | --- |
| Snapshot for object instance does not exist | Output New object instance as delta snapshot | ModNum | — | All components in New object instance |
| Snapshot component does not exist | Insert New component as Output component | ModNum | — | New component (Oper=Insert) |

TABLE 1-continued

| Snapshot State | Action | New Object Instance Component | Old Snapshot Component | Output Component |
|---|---|---|---|---|
| Snapshot component is same as object instance component | Insert key information in Output component | ModNum | ModNum | Key Information (Oper=None) |
| Snapshot component is older then object instance component | Insert New component as Output component | ModNum | ModNum−1 | New component (Oper=Update) |
| Snapshot component exits but object instance component does not | Insert Old component as Output component with Delete operation | — | ModNum | Key Information (Oper=Delete) |
| Snapshot component is newer then object instance component | Provide an Error | ModNum | ModNum+1 | |

Table 2 shows the logic for the component-level comparison between the old snapshot and the new integration object instance for the inbound process.

TABLE 2

| Snapshot State | Action | New Object Instance Component | Old Snapshot Component | Output Component |
|---|---|---|---|---|
| Snapshot for object instance does not exist | Perform same action on each New component as if component does not exist | — | — | |
| Snapshot component does not exist | Set ModNum=1 if Oper=Update. Retain ModNum if Oper=Insert or None | ModNum=1 (Insert) | — | ModNum (new ModNum) |
| | | ModNum=2 (Update) | — | ModNum=1 |
| | | ModNum=3 (None) | — | ModNum (new ModNum) |
| Snapshot component is same as object instance component | None | ModNum | ModNum | ModNum |
| Snapshot component is older then object instance component | Increment ModNum by 1 if Oper=Update Retain ModNum if Oper=Insert or None | ModNum (Insert) | — | ModNum (leave old ModNum) |
| | | ModNum (Update) | ModNum−2 | ModNum (increment old ModNum by 1) |
| | | ModNum (None) | ModNum | ModNum (leave old ModNum) |
| Snapshot component exits but object instance component does not | Delete snapshot component | — | ModNum | (Delete snapshot component) |
| Snapshot component is newer then object instance component | Provide an Error | ModNum | ModNum+1 | Provide an Error |

Table 3 lists the parameters for the Get Snapshot module of the Snapshot service. The Get Snapshot module provides a delta (i.e., full or incremental) snapshot for an integration object instance if it has changed since it was last published.

TABLE 3

| Parameter | Type | Description |
|---|---|---|
| Snapshot Mode | Input | Level at which changes are detected and reported |

TABLE 3-continued

| Parameter | Type | Description |
|---|---|---|
| | | 1 - full snapshot, 2 - component-level incremental snapshot, 3 - field-level incremental snapshot |
| Input Message | Input | Contains a new snapshot of an integration object instance received from the Snapshot Access service (which contain the object name and object row-ID) |
| Channel Name | Input | The publish channel name |

TABLE 3-continued

| Parameter | Type | Description |
| --- | --- | --- |
| Output Message | Output | Contains a delta snapshot generated by the Snapshot service |
| HasChanged | Output | A flag to indicate whether the integration object instance has changed since the last publication |

The Channel Name and Channel-ID are unique keys for the database tables that implement the channel (and may be used interchangeably).

Table 4 lists the parameters for the Update Snapshot module of the Snapshot service. The Update Snapshot module updates a snapshot stored in the Snapshot table as a result of an inbound process. The update is such that the new snapshot to be saved in the Snapshot table only incorporates the changes in the received delta snapshot and the changes to the integration object instance made by the local system can be detected at the next publication instance.

TABLE 4

| Parameter | Type | Description |
| --- | --- | --- |
| Input Message | Input | Contains the skeleton of a new snapshot of an integration object instance (which includes only the RMIOO) |
| Channel Name | Input | The publish channel name |

Table 5 lists the parameters for the Get Snapshot module of the Snapshot Access service. The Get Snapshot module returns the full snapshot of an integration object instance last generated (i.e., the latest version of the object instance).

TABLE 5

| Parameter | Type | Description |
| --- | --- | --- |
| Object Name | Input | The name of the integration object included in the snapshot |
| Object ID | Input | The row ID of the integration object instance included in the snapshot |
| Channel Name | Input | The publish channel name |
| Output Mode | Input | 0 - always return the snapshot<br>1 - return the snapshot only if it's not yet published |
| ObjectExist | Output | A flag to indicate whether or not the snapshot exists |
| Published | Output | A flag to indicate whether or not the snapshot has been published |
| Output Message | Output | Contains the retrieved snapshot of the integration object instance |

Table 6 lists the parameters for the Update Snapshot module of the Snapshot Access service. The Update Snapshot module updates a snapshot saved in the Snapshot table or creates a new snapshot if one does not exist for the integration object instance. The Update Snapshot module also updates the appropriate record in the Snapshot Admin table.

TABLE 6

| Parameter | Type | Description |
| --- | --- | --- |
| Input Message | Input | Contains the new snapshot of an integration object instance (which contain the object name and object row-ID) |
| Channel Name | Input | The publish channel name |

TABLE 6-continued

| Parameter | Type | Description |
| --- | --- | --- |
| Published | Output | A flag to indicate whether or not the snapshot has been published |
| Received | Output | A flag to indicate whether or not the snapshot has been received |

Table 7 lists the parameters for the Insert Snapshot module of the Snapshot Access service. The Insert Snapshot module inserts a snapshot to the Snapshot table if the snapshot does not already exist in the table.

TABLE 7

| Parameter | Type | Description |
| --- | --- | --- |
| Input Message | Input | Contains the new snapshot of an integration object instance (which contain the object name and object row-ID) |
| Channel Name | Input | The publish channel name |
| Published | Output | A flag to indicate whether or not the snapshot has been published |

Table 8 lists the parameters for the Delete Snapshot module of the Snapshot Access service. The Delete Snapshot module deletes an existing snapshot stored in the Snapshot table (and may also update the appropriate database tables).

TABLE 8

| Parameter | Type | Description |
| --- | --- | --- |
| Channel Name | Input | The publish channel name |
| Object Name | Input | The name of the integration object to be deleted |
| Object ID | Input | The row ID of the integration object instance whose snapshot is to be deleted |

For each of the modules in the Snapshot service and the Snapshot Access service, fewer, additional, and/or different parameters may also be used and are within the scope of the invention.

Figure 10:
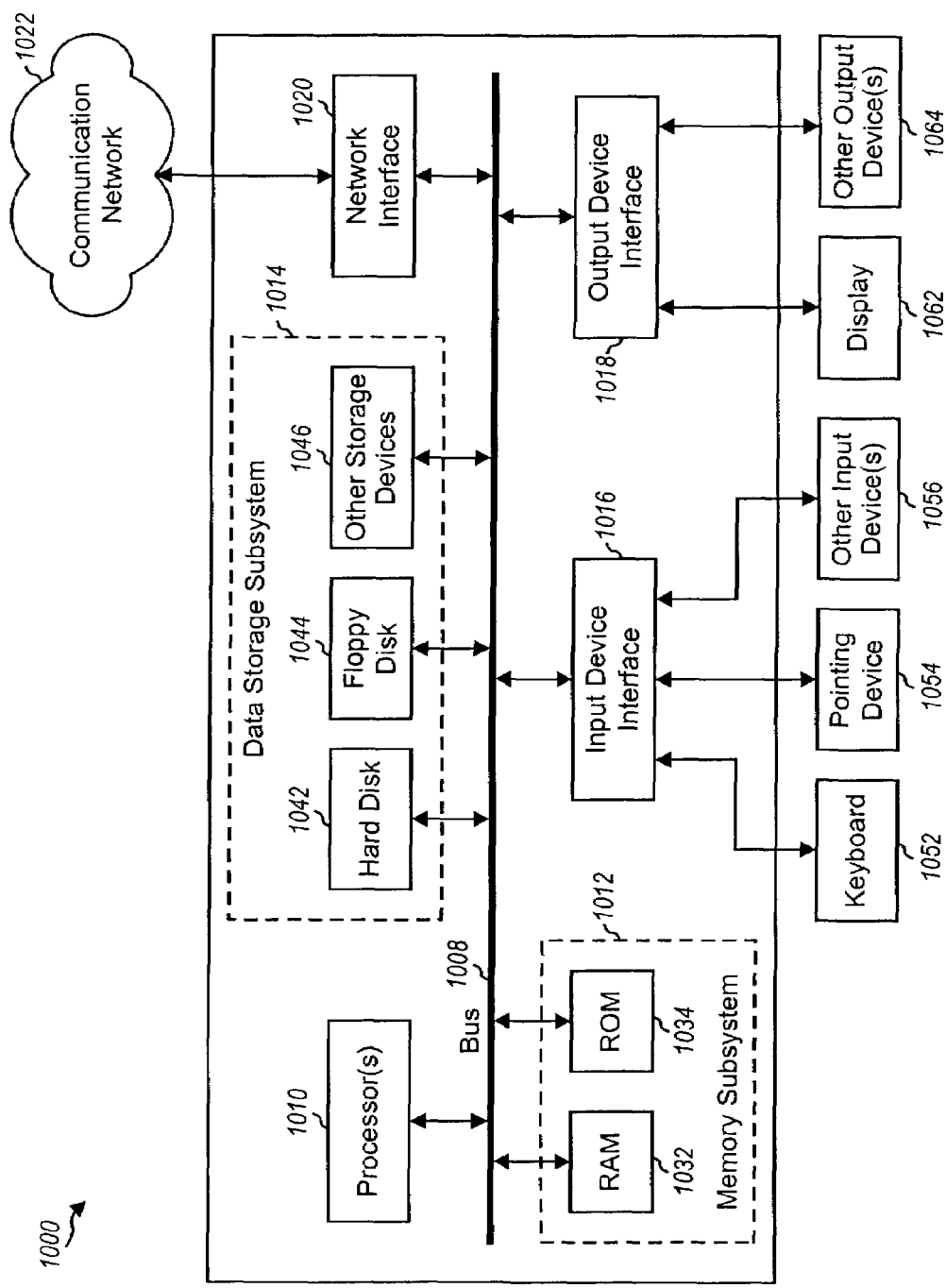
FIG. 10 is a block diagram of a computer system.

FIG. 10 is a block diagram of an embodiment of a computer system 1000 that may be used to implement systems 110*a* and 110*b* in FIG. 1. System 1000 includes a bus 1008 that interconnects major subsystems such as one or more processors 1010, a memory subsystem 1012, a data storage subsystem 1014, an input device interface 1016, an output device interface 1018, and a network interface 1020. Processor(s) 1010 perform many of the processing functions for system 1000 and communicate with a number of peripheral devices via bus 1008.

Memory subsystem 1012 may include a RAM 1032 and a ROM 1034 used to store codes and data that implement various aspects of the invention. In a distributed environment, the program codes and data may be stored on a number of computer systems and used by the processors of these systems. Data storage subsystem 1014 provides non-volatile storage for program codes and data, and may include a hard disk drive 1042, a floppy disk drive 1044, and other storage devices 1046 such as a CD-ROM drive, an optical drive, and removable media drive.

Input device interface 1016 provides interface with various input devices such as a keyboard 1052, a pointing device 1054 (e.g., a mouse, a trackball, a touch pad, a graphics tablet, a scanner, or a touch screen), and other input device(s) 1056. Output device interface 1018 provides an interface with various output devices such as a display 1062 (e.g., a CRT or an LCD) and other output device(s) 1064. Network interface 1020 provides an interface for system 1000 to communicate with other computers coupled to communication network 1022.

Many other devices or subsystems (not shown) may also be coupled to system 1000. In addition, it is not necessary for all of the devices shown in FIG. 10 to be present to practice the invention. Furthermore, the devices and subsystems may be interconnected in configurations different from that shown in FIG. 10. One or more of the storage devices may be located at remote locations and coupled to system 1000 via communication network 1022. The operation of a computer system such as that shown in FIG. 10 is readily known in the art and not described in detail herein. The source codes to implement certain embodiments of the invention may be operatively disposed in memory subsystem 1012 or stored on storage media such as a hard disk, a floppy disk, or a CD-ROM that is operative with a CD-ROM player.

The foregoing description of the specific embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein, and as defined by the following claims.

What is claimed is:

1. A method comprising:
   receiving, from a publishing system comprising a first database with a first schema associated therewith, a list of one or more object instances to be sent to a recipient system comprising a second database with a second schema associated therewith, wherein said first schema is different from said second schema;
   for each object instance in the list, determining whether the object instance has changed since the object instance was previously sent to the recipient system, wherein the first schema is used to determine whether the object instance has changed, if at all;
   for each object instance that has changed since previously sent to the recipient system, generating a delta snapshot comprising data indicative of changes between a current version and the version of the object instance previously sent to the recipient system, wherein the delta snapshot is generated using the first and second schemas; and
   sending to the recipient system at least one delta snapshot for at least one changed object instance.

2. The method of claim 1, wherein the delta snapshot for each changed object instance includes data for the entire object instance.

3. The method of claim 1, wherein the delta snapshot for each changed object instance includes data for each element, at a particular sub-level, that has changed.

4. The method of claim 1, further comprising:
   generating a snapshot for at least one changed object instance for which a delta snapshot is sent to the recipient system.

5. The method of claim 4, wherein the snapshot comprises key information indicative of a version number and a location for each component in the object instance.

6. The method of claim 4, further comprising:
   maintaining a first table for all generated snapshots.

7. The method of claim 6, further comprising:
   maintaining a second table comprising data indicative of prior exchanges for each object instance having a corresponding snapshot stored in the first table.

8. In a computer system, a method comprising:
   receiving, at a recipient system comprising a first database with a first schema associated therewith, a plurality of delta snapshots from a publishing system comprising a second database with a second schema associated therewith, wherein said first schema is different from said second schema, and wherein each of said delta snapshots comprise data indicative of changes for the respective object instance since a previously published version of the respective object instance was received at the recipient system from the publishing system, wherein each of the delta snapshots were generated using the first schema; and
   for each received delta snapshot,
      retrieving the corresponding object instance,
      updating the retrieved object instance with the changes included in the delta snapshot, wherein the retrieved object instance is updated in accordance with the second schema, and
      generating a snapshot indicative of a particular state of the updated object instance.

9. The method of claim 8, wherein the snapshot is generated such that changes in the received delta snapshot are not published.

10. The method of claim 9, wherein the snapshot is further generated such that unpublished changes to the object instance are noted for subsequent publication.

11. A storage medium having embodied therein computer executable instructions for
   receiving, from a publishing system comprising a first database with a first schema associated therewith, a list of object instances to be sent to a recipient system comprising a second database with a second schema associated therewith, wherein said first schema is different from said second schema;
   for each object instance in the list, determining whether the object instance has changed since the object instance was previously sent to the recipient system, if at all, based on a first representation for the object instance, wherein the first schema is used to determine whether each object instance has changed;
   for each object instance that has changed since the object instance was previously sent to the recipient system, generating a second representation for the changed object instance using the first and second schemas, comprising data indicative of changes between a current version and the version of the object instance previously sent to the recipient system; and
   sending to the recipient system at least one second representation for at least one changed object instance.

12. The storage medium of claim 11, wherein the second representation for each changed object instance comprises data for the entire object instance.

13. The storage medium of claim 11, wherein each object instance comprises one or more components, and wherein the second representation for each changed object instance comprises data for each component that has changed.

14. The storage medium of claim 13, wherein the each component comprises one or more fields, and wherein the second representation for each changed object instance includes data for each field that has changed.

15. The storage medium of claim 11, wherein each object instance comprises one or more elements at one or more sub-levels, and wherein the second representation for each changed object instance comprises data for each element, at a particular sub-level, that has changed.

16. The storage medium of claim 15, wherein the particular sub-level at which changes are detected is either a component level or a field level.

17. The storage medium of claim 15, wherein the second representation further comprises, for each changed element, an indication of a particular operation to be performed for the changed element.

18. The storage medium of claim 17, wherein the operation for each changed component is selected from a group consisting of none, update, insert, and delete.

19. The storage medium of claim 11, wherein the computer-usable medium is further embodied with computer-readable program codes for
generating a first representation for each changed object instance sent to the recipient system.

20. The storage medium of claim 19, wherein each first representation for an object instance comprises key information indicative of a version number of each component in the object instance.

21. The storage medium of claim 20, wherein the key information is further indicative of a location for each component in the object instance.

22. The storage medium of claim 19, wherein the storage medium is further embodied with computer executable instructions for maintaining a first table for all first representations.

23. The storage medium of claim 22, wherein the computer-usable medium is further embodied with computer executable instructions for maintaining a second table comprising data indicative of prior exchanges for each object instance having a corresponding first representation stored in the first table.

24. The storage medium of claim 23, wherein the computer-usable medium is further embodied with computer executable instructions for updating the data in the second table for each second representation sent or received.

25. The storage medium of claim 23, wherein the computer-usable medium is further embodied with computer executable instructions for updating the data in the second table for each first representation generated.

26. The storage medium of claim 11, wherein the first representation for an object instance is an extensible markup language document.

27. A storage medium storing computer executable instructions comprising:
computer executable instructions for receiving, from a publishing system comprising a first database with a first schema associated therewith, delta snapshots each comprising data indicative of changes for a respective object instance since a previously published version of the respective object instance was received from the publishing system by a recipient system comprising a second database with a second schema associated therewith, wherein said first schema and said second schema are different, wherein the delta snapshot is generated using the first schema;
computer executable instructions for retrieving the object instance corresponding to each received delta snapshot;
computer executable instructions for updating each retrieved object instance with changes included in the corresponding delta snapshot, wherein the retrieved object is undated in accordance with the second schema;
computer executable instructions for generating a snapshot indicative of a particular state of each updated object instance; and
computer executable instructions for sending to the recipient system at least one delta snapshot for at least one changed object instance.

28. In a computer system, a method comprising:
creating an integration object instance representing one or more object instances to be sent to a recipient system, wherein said integration object instance is configured to represent said one or more object instances regardless of software-specific formats of the one or more object instances;
for each object instance, maintaining a modification status identifier to determine whether the integration object instance containing said object instance was previously sent to the recipient system, if at all;
for each object instance that has changed since it was previously sent to the recipient system, generating a delta snapshot for the integration object instance comprising data indicative of changes between a current version of the integration object instance and the version of the integration object instance previously sent to the recipient system, wherein the delta snapshot is generated using the first schema; and
sending at least one delta snapshot for the integration object instance to the recipient system;
receiving said at least one delta snapshot for the integration object instance at said recipient system; and
for each received delta snapshot, configuring said recipient system to retrieve the corresponding integration object instance and to update the retrieved integration object instance with the changes included in the delta snapshot, wherein the corresponding object instance is updated using the second schema.

* * * * *

UNITED STATES PATENT AND TRADEMARK OFFICE
CERTIFICATE OF CORRECTION

PATENT NO.       : 7,287,249 B2
APPLICATION NO.  : 10/299211
DATED            : October 23, 2007
INVENTOR(S)      : Coyle et al.

It is certified that error appears in the above-identified patent and that said Letters Patent is hereby corrected as shown below:

On sheet 4 of 13, figure 3, line 3, delete "Snaphot" and insert -- Snapshot --, therefor.

On sheet 8 of 13, figure 7, box no. 726, line 1, delete "snapshop" and insert -- snapshot --, therefor.

In column 1, line 48, before "Conventionally," delete "to.".

In column 9, line 24, after "object" delete "-".

In column 10, line 17, delete "(Oper-Delete)" and insert -- (Oper=Delete) --, therefor.

In column 10, line 43, after "The" delete "a".

In column 16, line 30, delete "(Oper-None)" and insert -- (Oper=None) --, therefor.

Signed and Sealed this

Twenty-fourth Day of June, 2008

JON W. DUDAS
*Director of the United States Patent and Trademark Office*